(12) United States Patent
Kataoka et al.

(10) Patent No.: US 7,508,468 B2
(45) Date of Patent: Mar. 24, 2009

(54) METHOD OF MANUFACTURING LIQUID CRYSTAL DISPLAY DEVICE AND THE LIQUID CRYSTAL DISPLAY DEVICE

(75) Inventors: Shingo Kataoka, Kawasaki (JP); Hiroyasu Inoue, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 358 days.

(21) Appl. No.: 11/384,821

(22) Filed: Mar. 21, 2006
(Under 37 CFR 1.47)

(65) Prior Publication Data

US 2007/0042279 A1    Feb. 22, 2007

(30) Foreign Application Priority Data

Mar. 24, 2005    (JP)    ............... 2005-087023

(51) Int. Cl.
  G02F 1/133    (2006.01)
  G02F 1/135    (2006.01)
  G02F 1/1333    (2006.01)
  C09K 1/13    (2006.01)

(52) U.S. Cl. ............... 349/110; 349/22; 349/24; 349/111; 349/183; 349/184

(58) Field of Classification Search ............... 349/22, 349/24, 110, 111, 183, 184
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 5,855,968 A * | 1/1999 | Hirata et al. | 427/533 |
| 5,909,265 A * | 6/1999 | Kim et al. | 349/129 |
| 6,417,905 B1 * | 7/2002 | Woo et al. | 349/124 |

FOREIGN PATENT DOCUMENTS

| | | |
|---|---|---|
| JP | 5-66412 | 3/1993 |
| JP | 6-160818 | 6/1994 |
| JP | 3520376 | 2/2004 |

* cited by examiner

Primary Examiner—Julie Ngo
(74) Attorney, Agent, or Firm—Nixon & Vanderhye, P.C.

(57) ABSTRACT

A light blocking mask covering half of a picture element is formed on a first substrate. Thereafter, the first substrate and a second substrate are placed to face each other, and liquid crystals with negative dielectric anisotropy are sealed between these substrates, whereby a liquid crystal panel is formed. A polymer constituent which is polymerized by light is added in advance to the liquid crystals. Next, ultraviolet is irradiated from the side of the first substrate, and, after removing the light blocking mask, ultraviolet is once again irradiated. Thus, in picture element, a region where binding force with respect to liquid crystal molecules is large (a region where a threshold voltage in transmittance-voltage characteristics is high) and a region where binding force with respect to liquid crystal molecules is small (a region where a threshold voltage in transmittance-voltage characteristics is low) are formed.

4 Claims, 9 Drawing Sheets under a common electrode 22 of the opposite substrate 20. These protrusions 23 are placed at positions obliquely deviated from the slits 12a of the picture element electrode 12 as shown in FIG. 1A. The surfaces of the common electrode 22 and the protrusions 23 are also covered with a vertical alignment film 24 made of, for example, polyimide.

METHOD OF MANUFACTURING LIQUID CRYSTAL DISPLAY DEVICE AND THE LIQUID CRYSTAL DISPLAY DEVICE

CROSS-REFERENCE TO RELATED APPLICATION

This application is based on and claims priority of Japanese Patent Application No. 2005-87023 filed on Mar. 24, 2005, the entire contents of which are incorporated herein by reference.

BACKGROUND OF THE INVENTION

1. Field of the Invention

The present invention relates to a method of manufacturing a multi-domain vertical alignment (MVA) liquid crystal display device and to a multi-domain vertical alignment liquid crystal display device in which liquid crystals with negative dielectric anisotropy are sealed between two substrates, which are placed to face each other.

2. Description of the Prior Art

Liquid crystal display devices have the advantages that they are thin and light and that they can be operative at low voltages and have low power consumption. Accordingly, liquid crystal display devices are widely used in various kinds of electronic devices. In particular, active matrix liquid crystal display devices, in which a thin film transistor (TFT) is provided as a switching element for each picture element, show excellent display quality, which is comparable to that of cathode-ray tube (CRT) displays, and therefore have come to be widely used for displays for televisions, personal computers, and the like.

In general, a liquid crystal display device has a structure in which liquid crystals are sealed between two substrates, which are placed to face each other. A TFT, a picture element electrode, and the like are formed on one substrate, while color filters, a common electrode, and the like are formed on the other substrate. Hereinafter, the substrate on which a TFT, a picture element electrode, and the like are formed is referred to as a TFT substrate; and the substrate, which is disposed to face the TFT substrate, is referred to as an opposite substrate. A structure formed by sealing liquid crystals between the TFT substrate and the opposite substrate is referred to as a liquid crystal panel.

Heretofore, twisted nematic (TN) liquid crystal display devices have been widely used, in which liquid crystals with positive dielectric anisotropy are sealed between two substrates, and in which liquid crystal molecules are twisted and aligned. However, TN liquid crystal display devices have a disadvantage that viewing angle characteristics are poor and that contrast and color greatly change when the screen is viewed from an oblique direction. Accordingly, multi-domain vertical alignment (MVA) liquid crystal display devices, which have favorable viewing angle characteristics, have been developed and put to practical use.

FIGS. 1A and 1B are cross-sectional schematic views showing an example of an MVA liquid crystal display device. A TFT substrate 10 and a opposite substrate 20 are placed with spacers (not shown) interposed therebetween, and liquid crystals 30 with negative dielectric anisotropy are sealed between these two substrates 10 and 20. On a picture element electrode 12 of the TFT substrate 10, slits 12a are provided as alignment control structures to determine the oblique direction of liquid crystals when applying a voltage. The surface of the picture element electrode 12 is covered with a vertical alignment film 14 made of, for example, polyimide.

Meanwhile, a plurality of bank-like protrusions 23 are also formed as alignment control structures under a common electrode 22 of the opposite substrate 20. These protrusions 23 are placed at positions obliquely deviated from the slits 12a of the picture element electrode 12 as shown in FIG. 1A. The surfaces of the common electrode 22 and the protrusions 23 are also covered with a vertical alignment film 24 made of, for example, polyimide.

Polarizing plates (not shown) are placed under the TFT substrate 10 and over the opposite substrate 20, respectively, in a way that absorption axes are orthogonal to each other. A backlight (not shown) is also fastened under the TFT substrate 10.

In the MVA liquid crystal display device made up as described above, in the state where a voltage is not applied between the picture element electrode 12 and the common electrode 22, liquid crystal molecules 30a are aligned perpendicular to the substrate surfaces as shown in FIG. 1A. However, the liquid crystal molecules 30a in the vicinities of the protrusions 23 are aligned in directions perpendicular to the inclined surfaces of the protrusions 23. In this case, the light, which goes into a liquid crystal layer through polarizing plates from the downside of the TFT substrate 10, passes through the liquid crystal layer without any change in polarizing direction, and is blocked by the polarizing plate placed over the opposite substrate 20. In this case, a black display is produced.

When a voltage is applied between the picture element electrode 12 and the common electrode 22, the liquid crystal molecules 30 are inclined at an angle that corresponds to the applied voltage. In this case, as shown in FIG. 1B, the oblique directions of the liquid crystal molecules 30a are different on both sides of each of the slits 12a and the protrusions 23. Thus, what is called alignment division (multi-domain) is achieved. As shown in FIG. 1B, when the liquid crystal molecules 30a are aligned with an oblique direction relative to the substrate surfaces, light going into the liquid crystal layer through the polarizing plate from the downside of the TFT substrate 10 changes in polarizing direction in the liquid crystal layer, and passes through the polarizing plate which is placed over the opposite substrate 20. The amount of light passing through the polarizing plate depends on a voltage which is applied between the picture element electrode 12 and the common electrode 22.

As shown in this FIG. 1B, in the MVA liquid crystal display device, the tilt directions of the liquid crystal molecules 30a are different on both sides of each of the slits 12a and the protrusions 23 when a voltage is applied. Accordingly, the leakage of light in oblique directions is suppressed, and excellent viewing angle characteristics can be obtained.

In the MVA liquid crystal display device, since the tilt directions of the liquid crystal molecules are not determined by an alignment film, a rubbing process and a washing process for removing dust generated by the rubbing process, which are required for a TN liquid crystal display device, are eliminated; and therefore it has the advantage that the number of manufacturing steps are reduced. Additionally, non-uniformity in display caused by non-uniformity in the alignments of the liquid crystal molecules, which arises out of a rubbing process, is also suppressed.

As a method of manufacturing a liquid crystal display device which does not require a rubbing process, Patent Publication No. 3520376 describes that liquid crystals having been added with a polymer constituent (polymer molecule precursor) are sealed between a pair of substrates, and thereafter the polymer constituent is polymerized by irradiation of ultraviolet to form an alignment film. Japanese Patent Application Laid-open No. Hei 6-160818 describes a manufacturing a liquid crystal element that liquid crystals having been added with a polymer constituent are sealed between a pair of substrates, and thereafter the polymer constituent is polymerized to form a plurality of domains with various kinds of characteristics which are different from each other.

Incidentally, in a conventional MVA liquid crystal display device, the phenomenon occurs in which the screen looks whitish when viewed from an oblique direction. FIG. 2 is a view showing T-V (transmittance-voltage) characteristics for the case where the screen is viewed from the front and those for the case where the screen is viewed from the oblique direction (azimuth 45° and polar angle 60°), with applied voltage (V) on the horizontal axis and transmittance on the vertical axis. In the present application, an angle formed by a line, which is a projection of a line of sight on a liquid crystal panel, and the X-axis of the liquid crystal panel (a line extended from the center, as the origin, of the liquid crystal panel to the right direction) is referred to as azimuth, while an angle formed by a line normal to the liquid crystal panel and a line of sight is referred to as polar angle.

As shown in FIG. 2, in the case where a voltage slightly higher than a threshold voltage of the T-V characteristics (hereinafter, simply referred to as "the threshold voltage") is applied to the picture element electrode, the transmittance when the screen is viewed from the oblique direction is higher than that when the screen is viewed from the front. Further, when the applied voltage becomes high to some extent, the transmittance when the screen is viewed from the oblique direction becomes lower than that when the screen is viewed from the front. Accordingly, differences in brightness between red, green, and blue picture elements become small when the screen is viewed from the oblique direction. As a result, the phenomenon in which the screen looks whitish occurs as described previously. This phenomenon occurs not only in MVA liquid crystal display devices but also in TN liquid crystal display devices.

In the specification of U.S. Pat. No. 4,840,460, a technology is proposed in which a plurality of sub picture element electrodes are provided in one picture element and in which these sub picture elements are capacitively coupled. In such a liquid crystal display device, since a voltage to be applied on each sub picture element electrode is determined in accordance with the capacitance between the sub picture element electrodes, different voltages can be applied to the sub picture elements, respectively. Accordingly, it appears that a plurality of regions having different threshold voltages from one another exist in one picture element region. In the case where a plurality of regions having different threshold voltages from one another exist in one picture element region as described above, the T-V characteristics of the picture element region is represented as a composition of the T-V characteristics of the respective sub picture element regions. AS a result, the phenomenon is suppressed in which the transmittance when viewed from the oblique direction becomes higher than that when viewed form the front, and the phenomenon in which the screen looks whitish is also suppressed.

In Japanese Patent Application Laid-open No. Hei 5-66412, a liquid crystal display device is disclosed in which, in order to improve the viewing angle characteristics, each picture element electrode is divided into a plurality of sub picture element electrodes and in which control electrodes are respectively placed under the sub picture element electrodes with an insulating film interposed therebetween. In this liquid crystal display device, the control electrode and the sub picture element electrode are capacitively coupled with the insulating film. The same voltage is applied to each of the control electrodes through a TFT, and a voltage in accordance with a capacitance between the control electrode and the sub picture element electrode is applied to each sub picture element electrode.

As described in these above public documents, a method in which display characteristics are improved by dividing one picture element region into a plurality of sub picture element regions having different T-V characteristics is called a half-tone grayscale (HT) method.

However, the inventors of the present patent application view the above-described HT method by capacitive coupling as having the following problems. That is, the HT method by capacitive coupling has a drawback that it is necessary to redesign an exposure mask and the like to be used at a time of manufacturing. In addition, the HT method by capacitive coupling needs to have a control electrode to be capacitive-coupled to a sub picture element electrode. In general, since a control electrode is formed at the same time as the forming of a source and a drain electrodes or a gate electrode of a TFT, it is made of metal such as aluminum (Al) and has a light blocking effect. Accordingly, the control electrode causes a decrease in the aperture ratio of a picture element, and the screen becomes dark. Although it is conceivable that a control electrode is formed of a transparent conductive material such as indium-tin oxide (ITO), the number of manufacturing steps will increase in that case.

SUMMARY OF THE INVENTION

In light of the above, an object of the present invention is to provide a method of manufacturing a liquid crystal display device, and to provide a liquid crystal display device in which a phenomenon where a screen looks whitish when viewed from an oblique direction can be suppressed, and which has, at the same time, a high aperture ratio to enable bright display.

The above described problems can be solved by a method of manufacturing a liquid crystal display device which has a plurality of picture elements arranged in matrix form and which has in one picture element a first and a second regions having different transmittance-voltage characteristics from each other. The method thereof includes the steps of: forming a light blocking mask on a portion of a first substrate, the portion corresponding to the second region; placing the first substrate and a second substrate to face each other so that a face of the first substrate, on which the light blocking mask is formed, is located outside, and sealing, between the first and second substrates, liquid crystals added with a polymer constituent to be polymerized by light; performing a first light irradiation that light is irradiated from the side of the first substrate to polymerize the polymer constituent in liquid crystals in the first region (hereinbelow referred to as the first irradiation process); removing the light blocking mask; and performing a second light irradiation that light is irradiated to polymerize the polymer constituent in liquid crystals in the first and second regions (hereinbelow referred to as the second irradiation process).

In the present invention, the light blocking mask is formed on the first substrate, and the liquid crystals are sealed between the first and second substrates; and thereafter the polymer constituent in the liquid crystals of the first region is polymerized by performing the first light irradiation process. Then, the light blocking mask is removed, and thereafter the polymer constituent in the liquid crystals of the first and second regions is polymerized by performing the second light irradiation process. Thus, the degree of polymerization of the polymer constituent contained in the first region becomes higher than that in the second region, and polymer is formed in which binding forces for liquid crystal molecules are large in the first region compared to those in the second region. The larger are the binding forces of polymer to liquid crystal molecules, the higher are the threshold voltages. Accordingly, two regions having different threshold voltages from each other are formed in one picture element, and a phenomenon in which the screen looks whitish when viewed from an oblique direction is suppressed. Furthermore, since the two regions having different threshold voltages from each other can be formed in one picture element without using control electrodes, a high aperture ratio is achieved, which enables the liquid crystal display device to have a bright display.

Meanwhile, it is conceivable that, instead of forming a light blocking mask on the substrate, an exposure mask having a light blocking pattern is disposed on the liquid crystal panel, and light is irradiated thereto. In this case, however, it is necessary to carry out a positioning of the exposure mask for every liquid crystal panel, which takes time. In addition, it causes a problem in which a layer of air is interposed between the liquid crystal panel and the exposure mask so that the wrap-around of light occurs, and thus it becomes difficult to obtain a desired area ratio for the two regions having different threshold voltages from each other.

On the other hand, in the present invention, since it is possible to form a light blocking pattern on a master substrate, it is not necessary to perform the positioning of the exposure mask for every liquid crystal panel at the time of irradiation of light. Moreover, since there is not a layer of air interposed between the substrate and the light blocking pattern, it is possible to obtain a desired area ratio for the two regions having different threshold voltages from each other.

The above-described problems can be solved by a method of manufacturing a liquid crystal display device which has a plurality of picture elements arranged in matrix form and which has in one picture element a first and a second regions with different transmittance-voltage characteristics from each other. The method thereof includes the steps of: placing a first face of a first substrate and a first face of a second substrate to face each other, and sealing liquid crystals added with a polymer constituent to be polymerized by light between these two faces; and performing a light irradiation that a light of first intensity is irradiated to liquid crystals in the first region from the side of a second face of the first substrate, and simultaneously a light of second intensity, which is lower than the first intensity, is irradiated to liquid crystals in the second region to polymerize the polymer constituent.

In the present invention, for example, a light reduction mask is formed on the first substrate at a position corresponding to the second region. Then, the light of first intensity is irradiated to liquid crystals in the first region, and at the same time light is irradiated to liquid crystals in the second region through the light reduction mask to polymerize the polymer constituent in the liquid crystals. Thus, two regions having different threshold voltages from each other are formed in one picture element, hence making it possible to suppress a phenomenon in which the screen looks whitish when viewed from an oblique angle.

In the present invention, since the polymer constituent in the first and second regions is simultaneously polymerized, move of the polymer constituent in the first and second regions is avoided, thus making it possible to avoid the fluctuation of characteristics which occurs when the polymer constituent moves.

For the polymerization of a polymer constituent, ultraviolet is generally used. When the light reduction mask is formed of a transparent conductive material such as ITO, it exhibits the following features: the intensity of the ultraviolet passing through the light reduction mask is sufficiently attenuated; and transmittance for a visual light is sufficiently higher than that for ultraviolet. Thus, since the operation of the liquid crystal display device is not influenced by the presence of the light reduction mask even when it is not removed, a process for removing the light reduction mask can be omitted.

DESCRIPTION OF THE PREFERRED EMBODIMENTS

Embodiments of the present invention will, hereinafter, be described with reference to the accompanying drawings.

First Embodiment

Figure 1A:
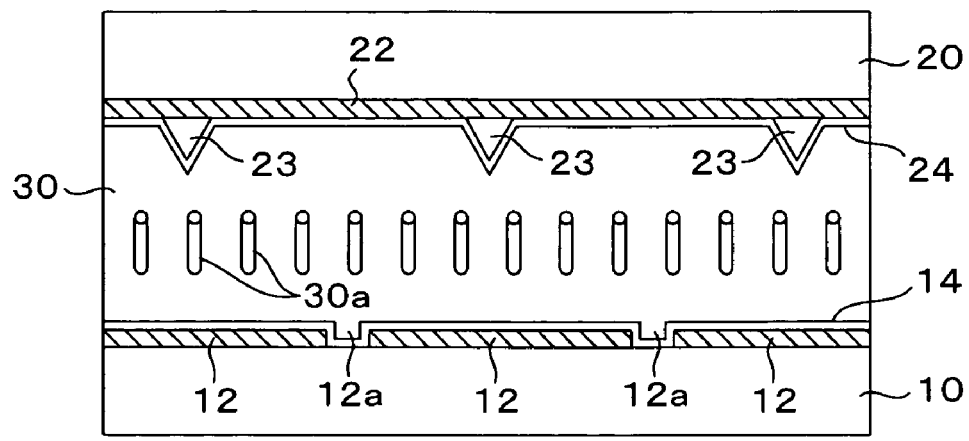
FIGS. 1A and 1B are cross-sectional schematic views showing one example of an MVA liquid crystal display device.
Figure 1B:
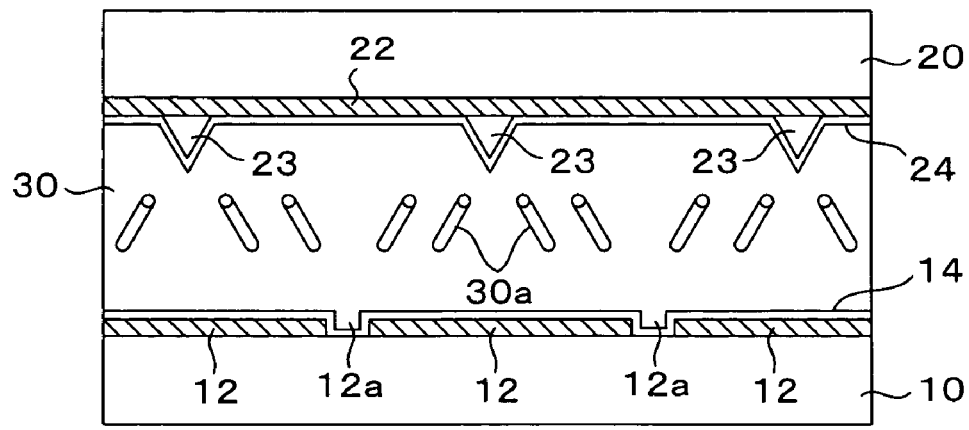
Figure 2:
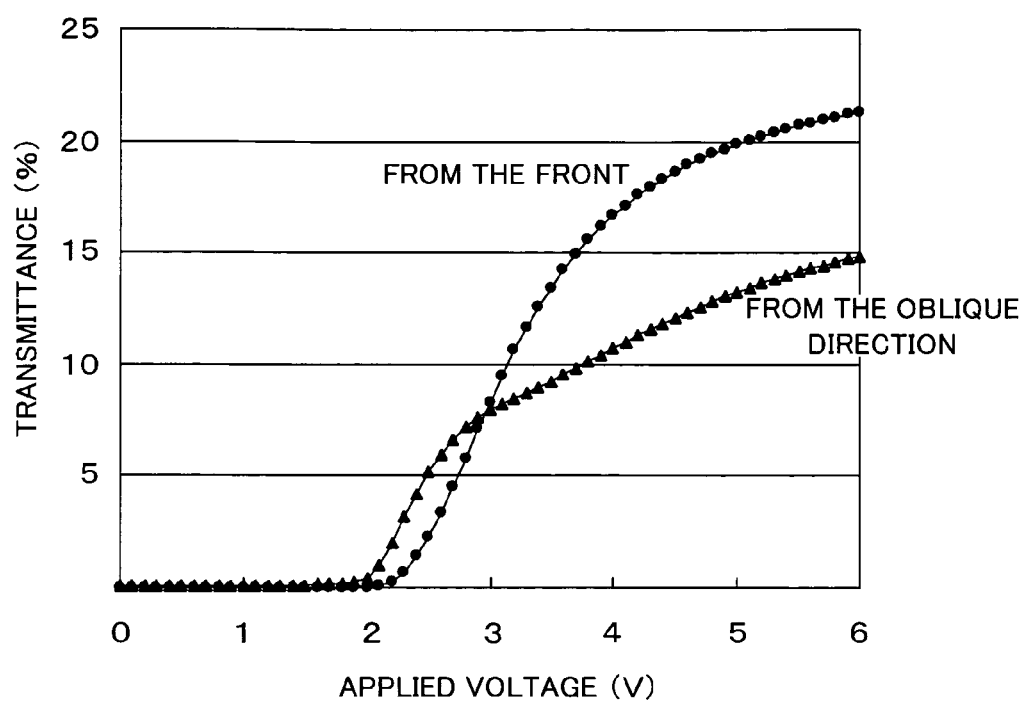
FIG. 2 is a view showing T-V (transmittance-voltage) characteristics when a screen is viewed from the front and those when the screen is viewed from the oblique direction (azimuth 45° and polar angle 60°).
Figure 3:
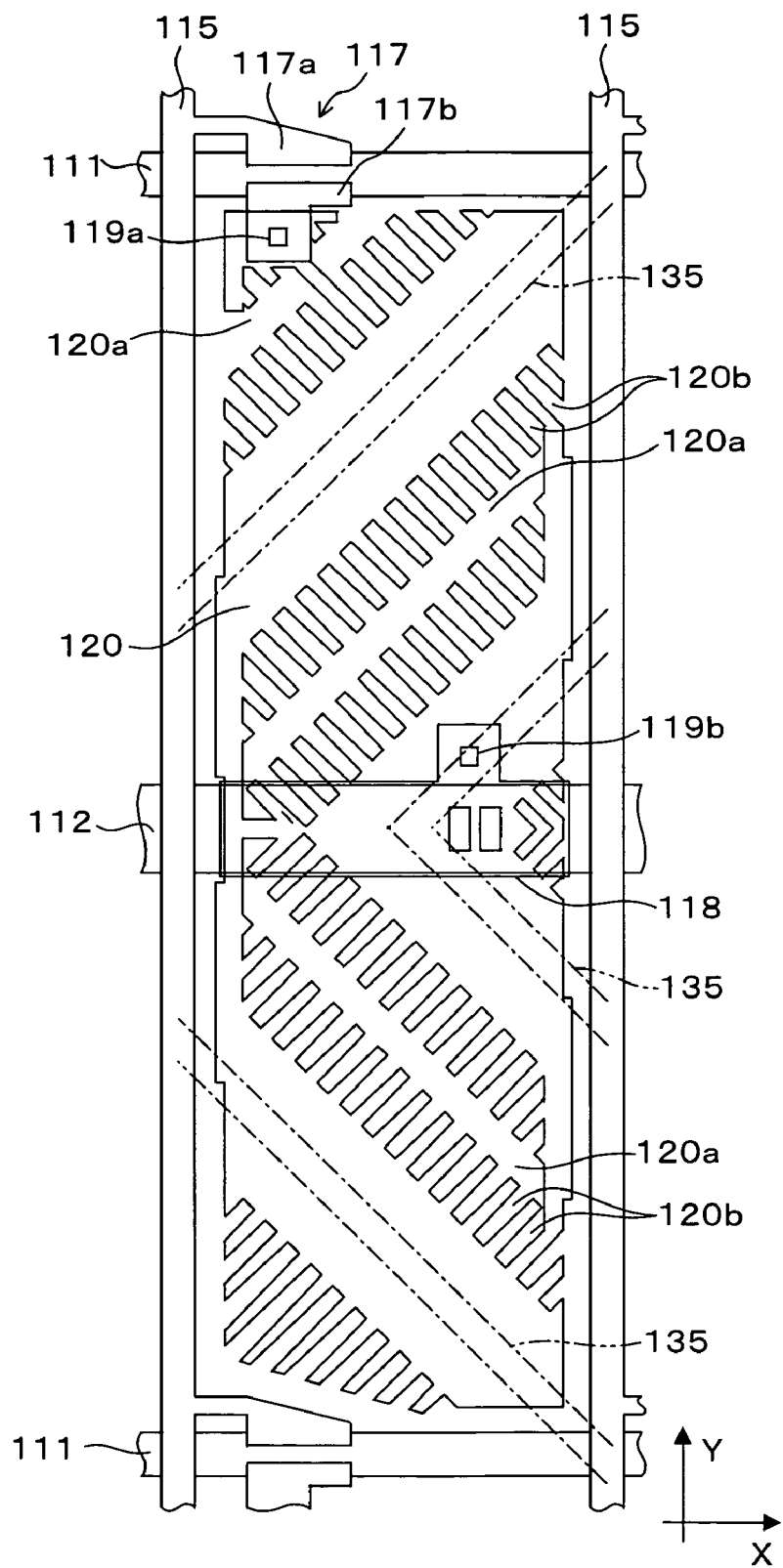
FIG. 3 is a plan view showing a liquid crystal display device of a first embodiment of the present invention.
Figure 4:
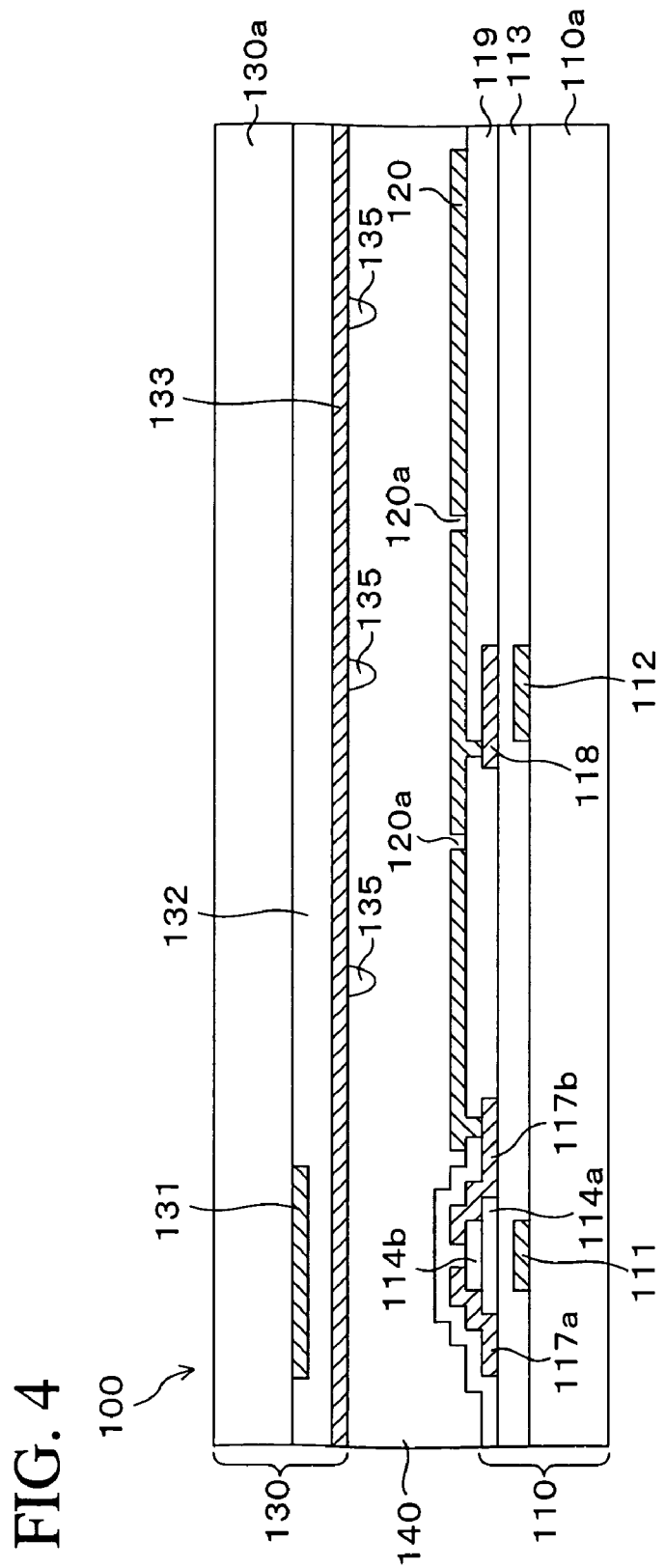
FIG. 4 is a cross-sectional schematic view of the same.

FIG. 3 is a plan view showing a liquid crystal display device of a first embodiment of the present invention, and FIG. 4 is a cross-sectional schematic view thereof. In FIGS. 3 and 4, a region for one picture element of the liquid crystal display device is shown.

As shown in FIG. 4, a liquid crystal panel 100 includes a TFT substrate 110, an opposite substrate 130, and a liquid crystal layer 140 with liquid crystals having a negative dielectric anisotropy, which are interposed between the TFT substrate 110 and the opposite substrate 130. Polarizing plates (not shown) are disposed on the front side (the observer side; i.e. the upper side in FIG. 4) of the liquid crystal panel 100 and the backside (the lower side in FIG. 4) thereof, and, further, on the backside thereof a backlight (not shown) is placed. In the liquid crystal display device of the present embodiment, as described later, a polymer constituent added into the liquid crystal layer 140 is polymerized, and thereby two regions with different in T-V characteristics from each other are formed in one picture element.

As shown in FIG. 3, a plurality of gate bus lines 111 extending horizontally (in the direction of X-axis) and a plurality of data bus lines 115 extending vertically (in the direction of Y-axis) are formed on the TFT substrate 110. The gate bus lines 111 are placed in the vertical direction at intervals of, for example, approximately 300 μm, and the data bus lines 115 are placed in the horizontal direction at intervals of, for example, approximately 100 μm. Each of the rectangular regions defined by the gate bus lines 111 and the data bus lines 115 is a picture element region. In the present embodiment, a number of picture elements are provided in matrix form in the horizontal and vertical directions. On the substrate 110, auxiliary capacitance bus lines 112 are formed, which are placed parallel to the gate bus lines 111 and cross the centers of the picture element regions.

For each picture element region, a TFT 117, an auxiliary capacitance electrode 118, and a picture element electrode 120 are formed on the substrate 110. The TFT 117 uses part of the gate bus lines 111 as a gate electrode. As shown in FIG. 4, a semiconductor film 114a which functions as active layer for the TFT 117, and a channel protection film 114b are formed over the above described gate electrode, and a drain electrode 117a and a source electrode 117b are placed on both sides of the semiconductor film 114a at a position where the drain electrode 117a and the source electrode 117b face each other. The drain electrode 117a is connected to the data bus line 115.

The auxiliary capacitance electrode 118 is formed at a position where the auxiliary capacitance electrode 118 faces the auxiliary capacitance bus line 112 with a first insulating film 113 interposed therebetween. This auxiliary capacitance electrode 118, the auxiliary capacitance bus line 112, and the insulting film 113 interposed therebetween form an auxiliary capacitance.

A picture element electrode 120 is formed of a transparent conductive material such as ITO. Main slits 120a, which are extend in an oblique direction relative to the direction of Y-axis, and a number of fine slits 120b, which are extended in the direction orthogonal to the main slits 120a, are provided on the picture element electrode 120 as alignment control structures. The main slits 120a are symmetrically formed on the upper and lower sides of the auxiliary capacitance bus line 112 with the centerline thereof as the line of symmetry. Further, the fine slits 120b are formed at fixed intervals along the direction that the main slits 120a are extended.

A second insulating film (a interlayer insulating film) 119 is formed between the data bus line 115, the TFT 117, the auxiliary capacitance electrode 118a, and the picture element electrode 120; and the picture element electrode 120 is electrically connected to the source electrode 117b and the auxiliary capacitance electrode 118 through contact holes 119a and 119b formed in the second insulating film 119. The surface of the picture element electrode 120 is covered with a vertical alignment film (not shown) made of, for example, polyimide.

On the other hand, on the opposite substrate 130, a black matrix (light blocking film) 131, a color filter 132, a common electrode 133, and bank-like protrusions 135 as alignment control structures are formed. The black matrix 131 is made of metal, for example, such as Cr (chromium), or of black resin, and is placed at a position where the black matrix 131 faces the gate bus lines 111, the data bus lines 115, and the TFT 117 on the side of the TFT substrate 110. Of the color filter 132, there are three kinds i.e. one of red (R), of green (G), and of blue (B). A color filter of any one color is placed in each picture element. The common electrode 133 is made of a transparent conductive material, such as ITO, and is formed on (in FIG. 4, beneath) the color filter 132. The bank-like protrusions 135 are made of a dielectric material such as resin. As shown in FIG. 3, the protrusions 135 are formed in an area between the main slits 120a in parallel thereto. The surfaces of the common electrode 133 and the protrusions 135 are covered with a vertical alignment film (not shown) made of, for example, polyimide.

Hereinafter, a method of manufacturing the liquid crystal display device of the present embodiment will be described with reference to FIGS. 3 and 4. Firstly, a method of manufacturing the TFT substrate will be described.

To begin with, a first metal film having a laminated structure of, for example, Al (aluminum) and Ti (titanium) is formed by sputtering on one face (the upper face in FIG. 4) of a glass substrate 110a, which is served as a base for the TFT substrate 110. This first metal film is patterned by photolithography, and thus the gate bus lines 111 and the auxiliary capacitance bus lines 112 are formed.

Next, a first insulating film 113 (gate insulating film) made of, for example, $SiO_2$ is formed on the entire upper face of the glass substrate 110a by chemical vapor deposition (CVD). Subsequently, a semiconductor film (an amorphous silicon film or a polysilicon film) 114a serving as an active layer for the TFT 117 is formed on a predetermined region of the first insulating film 113. Thereafter, a SiN film is, for example, formed on the entire upper face of the glass substrate 110a, and is patterned by photolithography, thus forming a channel protection film 114b on an area to be a channel of the semiconductor film 114a.

Next, a second metal film having a laminated structure of, for example, Ti—Al—Ti is formed on the entire upper face of the glass substrate 110a, and patterned by photolithography, thus forming the data bus lines 115, the drain electrode 117a, the source electrode 117b, and the auxiliary capacitance electrode 118.

Next, a second insulating film 119 made of, for example, $SiO_2$, SiN, resin or the like is formed on the entire upper face of the glass substrate 110a. Then, the contact hole 119a communicating with the source electrode 117b, and the contact hole 119b communicating with the auxiliary capacitance electrode 118 are formed on the second insulating film 119 by photolithography.

Subsequently, an ITO film is formed on the entire upper face of the glass substrate 110a by sputtering. Then, the ITO film is patterned by photolithography, thereby forming the picture element electrode 120 having the main slits 120a and the fine slits 120b. This picture element electrode 120 is electrically connected to the source electrode 117b through the contact hole 119a, and also electrically connected to the auxiliary capacitance electrode 118 through the contact hole 119b.

Figure 5:
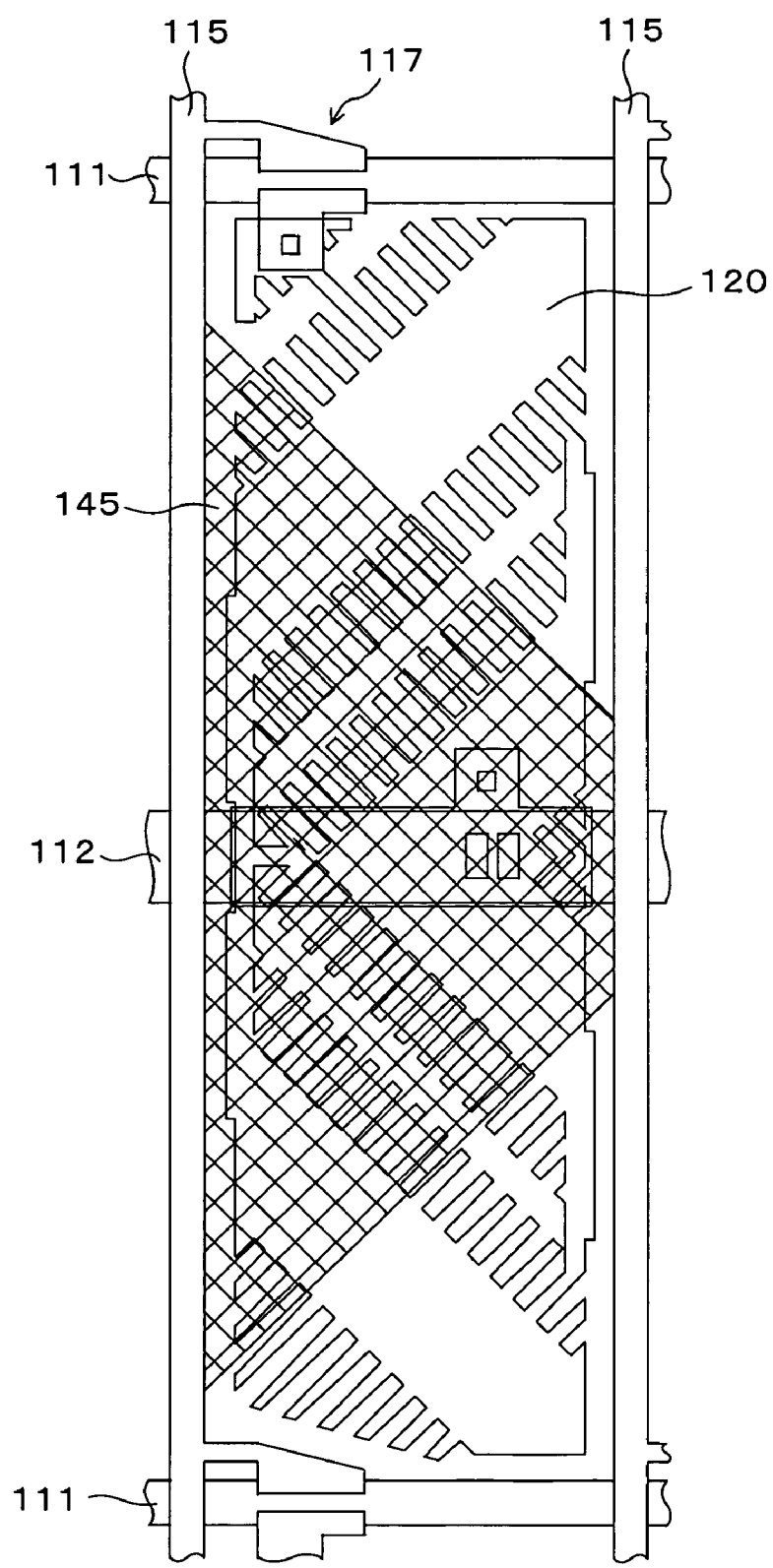
FIG. 5 is a plan view showing the shape of a light blocking mask of the first embodiment.

Thereafter, a light blocking mask is formed on the other face (the lower face in FIG. 4) of the glass substrate 110a. As shown in FIG. 5, a light blocking mask 145 (shown by hatching in FIG. 5) is formed so that almost half of the region for one picture element region is covered. This light blocking mask 145 is formed by forming a metal film made of Cr, Al, or the like, for example by sputtering, on an entire face of the glass substrate 110a, and thereafter patterning the metal film by photolithography. The light blocking mask 145 may be formed of resin. However, this light blocking mask 145 needs to be capable of blocking ultraviolet as described later.

Thereafter, a vertical alignment film (not shown) covering the surface of the picture element electrode 120 is formed by applying, for example, polyimide over the entire upper face of the glass substrate 110a. Thus, the TFT substrate is completed.

Next, a method of manufacturing the opposite substrate 130 will be described. First, a black matrix 131 made of metal, such as Cr, or black resin is formed on (in FIG. 4, beneath) the glass substrate 130a serving as a base for the opposite substrate 130. The black matrix 131 is formed to have a width slightly greater than that of the gate bus lines 111 and than that of the data bus lines 115, and is formed at a position where the black matrix 131 faces the gate bus lines 111, the data bus lines 115, and the TFT 117 on the side of the TFT substrate 110.

Next, the color filters 132 are formed on the glass substrate 130a using red, green, and blue photosensitive resins. The color filter 132 of any one color among red, green, and blue is placed in each picture element region. In the present embodiment, one pixel is constituted by the three picture elements, i.e. a red picture element, a green picture element, and a blue picture element, which are adjoining in the horizontal direction, hence enabling to display in various colors.

Subsequently, the common electrode 133 made of ITO is formed on the color filter 132 by sputtering. Then, photoresist is applied on the common electrode 133 to form a photoresist film. This photoresist film is exposed through a predetermined exposure mask, and thereafter a developing process is performed to form the bank-like protrusions 135.

Next, a vertical alignment film (not shown) covering the surfaces of the common electrode 133 and the protrusions 135 is formed by applying, for example, polyimide over the entire upper face of the glass substrate 130a. Thus, the opposite substrate 130 is completed.

The TFT substrate 110 and the opposite substrate 130 manufactured in the above described manner are placed to face each other with spacers (not shown) interposed therebetween, and liquid crystals with negative dielectric anisotropy are sealed between the TFT substrate 110 and the opposite substrate 130, hence constituting the liquid crystal panel 100. In the liquid crystals, a predetermined amount of polymer constituent (monomer or oligomer) and polymerization initiator is added in advance. As the polymer constituent, it is possible to use a compound having a photoreactive group such as acrylic acid ester or methacrylic acid ester.

Figure 6A:
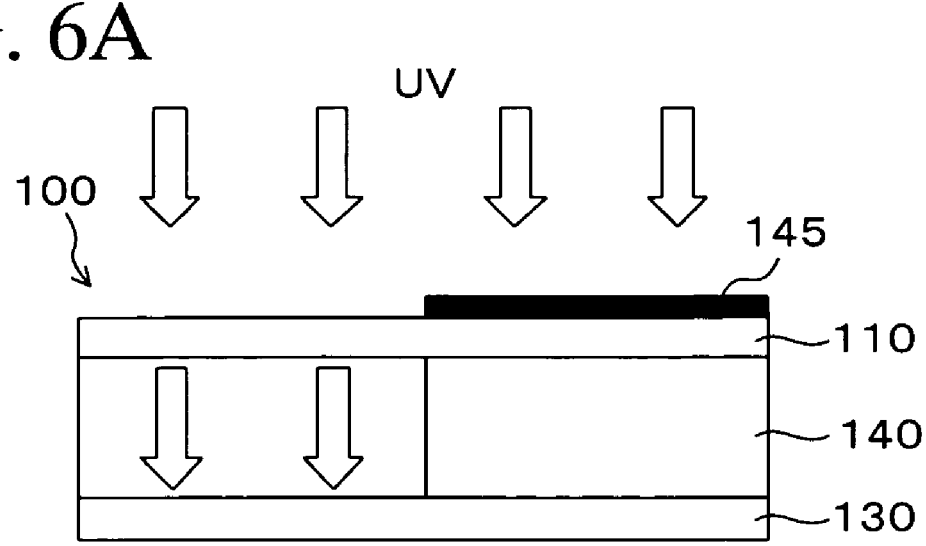
FIGS. 6A and 6B are cross-sectional schematic views showing a method of manufacturing the liquid crystal display device of the first embodiment.

Next, as shown in FIG. 6A, ultraviolet (UV) is irradiated from the side of the TFT substrate 110 where the light blocking mask 145 is formed, thereby polymerizing to some extent the polymer constituent which is contained in a region of the liquid crystal layer 140, which is not covered with the light blocking mask 145. The light blocking mask 145 is, thereafter, removed. When the light blocking mask 145 is made of metal, acidic or alkaline solution can be used to dissolve and remove it. When the light blocking mask 145 is made of resin, solvent can be used to dissolve and remove it. It is also possible to remove the light blocking mask 145 by polishing (mechanically or chemically polishing) it.

Figure 6B:
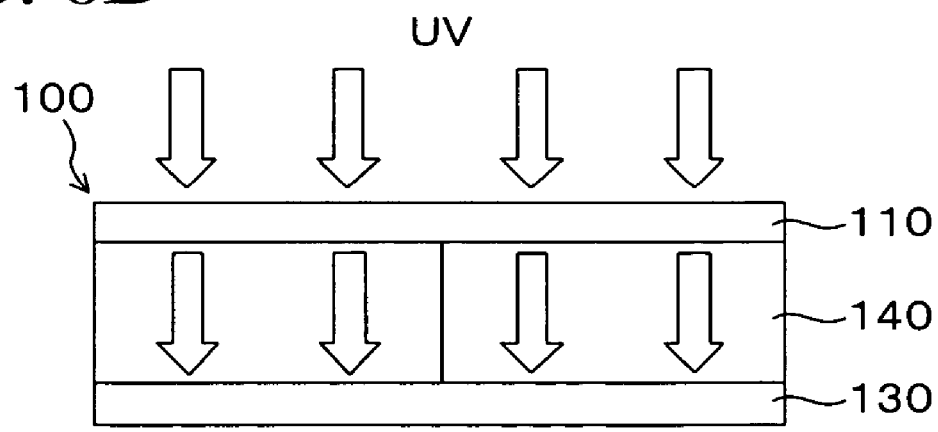

Subsequently, as shown in FIG. 6B, ultraviolet is irradiated over the entire surface of the liquid crystal panel 100, and thereby the remaining polymer constituent in the liquid crystal layer 140 is polymerized. With this polymerization, polymer having large binding forces with respect to liquid crystal molecules is formed in a region which is exposed in the process shown in FIG. 6A (hereinafter referred to as "the exposed region"), while polymer having small binding forces with respect to liquid crystal molecules is formed in a region where light is blocked with the light blocking mask 145 in the process shown in FIG. 6A (hereinafter referred to as "the light-blocked region"). As a result, the threshold voltage in the exposed region becomes higher than that in the light-blocked region, and thus two regions having different threshold voltages from each other are formed in one picture element.

Next, polarizing plates (not shown) are joined to both sides of the liquid crystal panel 100, and further a backlight (not shown) is also fastened. In this way, the liquid crystal display device of the present embodiment is completed.

In the present embodiment, as described above, the TFT 117, the picture element electrode 120 and the like are formed on one face of the glass substrate 110a which becomes the TFT substrate 110, and, on the other face thereof, the light blocking mask 145 is formed. After the liquid crystal panel 100 is formed, ultraviolet is irradiated from the side of the TFT substrate 110, and, furthermore, again irradiated after removing the light blocking mask 145. Thus, the region where biding forces with respect to liquid crystal molecules are large (i.e. the region where the threshold voltage is high) and the region where biding forces with respect to liquid crystal molecules are small (i.e. the region where the threshold voltage is low) are formed in one picture element. Consequently, the phenomenon where a screen of the liquid crystal display device looks whitish when viewed from an oblique direction is suppressed. Moreover, in the present embodiment, since the two regions having different threshold voltages from each other can be formed in one picture element without using control electrodes, a high aperture ratio is achieved, which enables the liquid crystal display device to have a bright display.

Furthermore, even when a defect occurs in the light blocking mask 145 due to sticking of dust thereto, or the like, it is easy to repair it because the light blocking mask 145 can be once removed, and thereafter another light blocking mask 145 can be formed. In addition, since the light blocking mask 145 is in contact with the glass substrate 110a, air does not lie between the glass substrate 110a and the light blocking mask 145, and occurrence of the wrap-around of light at a time of the irradiation of ultraviolet is also suppressed. This makes it possible to have a desired value on the ratio of areas between the two regions having different T-V characteristics from each other, thus preventing non-uniformity in display quality from occurring.

Second Embodiment

Hereinafter, a method of manufacturing the liquid crystal display device of a second embodiment of the present invention will be described. The present embodiment is different from the first embodiment in that, in the present embodiment, a light reduction mask is formed on the other face of the TFT substrate while the light blocking mask is formed thereon in the first embodiment. Since other processes in the present embodiment are basically the same as those in the first embodiment, the method of manufacturing will be described with reference to FIGS. 3 and 4.

First, as in the first embodiment, gate bus lines 111, auxiliary capacitance bus lines 112, a first insulating film 113, a TFT 117, an auxiliary capacitance electrode 118, a second insulating film 119, and a picture element electrode 120 are formed on one face (the upper face in FIG. 4) of a glass substrate 110a.

Figure 7:
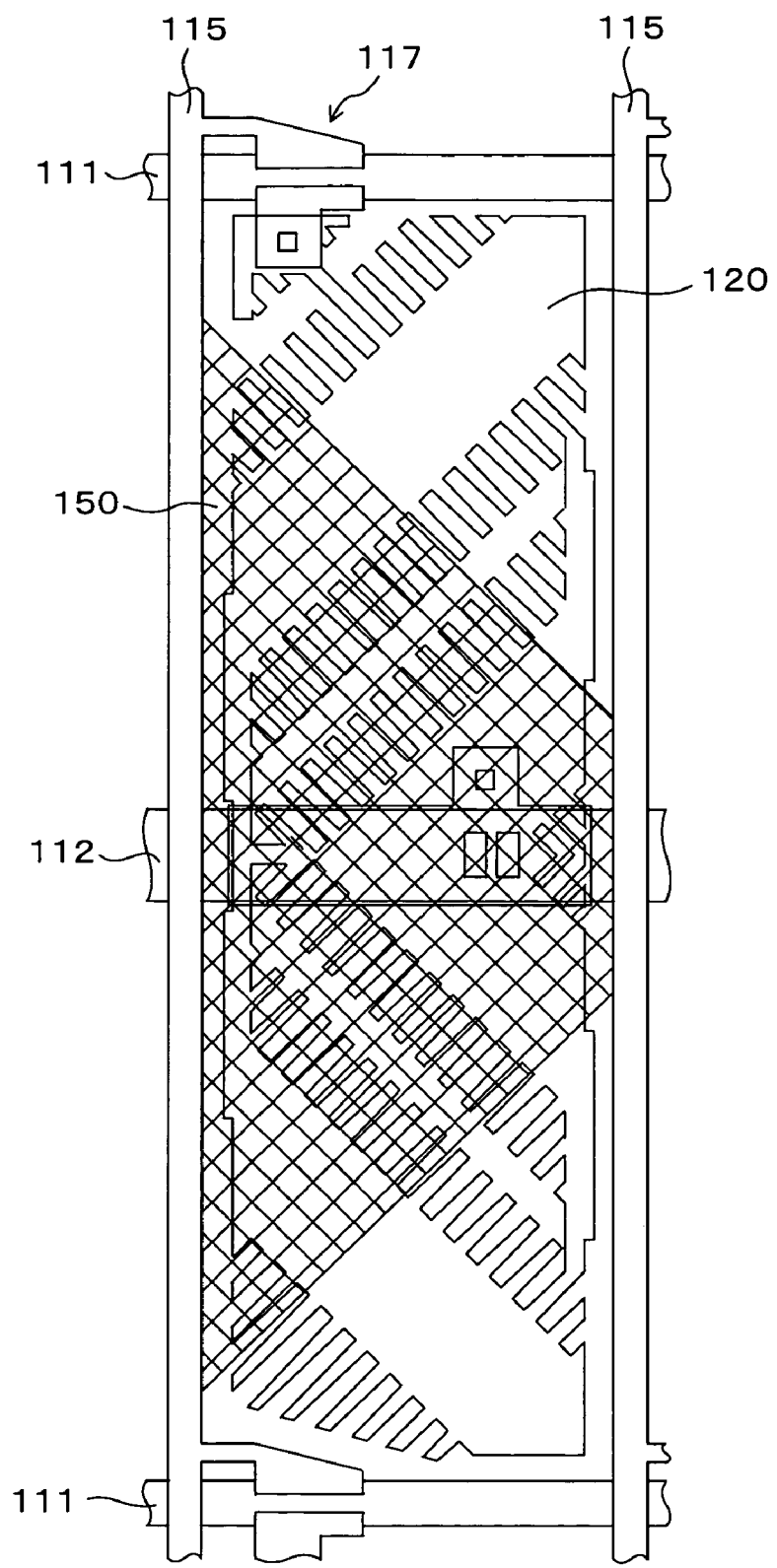
FIG. 7 is a plan view showing the shape of a light reduction mask of a second embodiment of the present invention.

Next, a light reduction mask is formed on the other face of the glass substrate 110a (the lower face in FIG. 4). As shown in FIG. 7, a light reduction mask 150 (shown by hatching in FIG. 7) is formed so that almost half of one picture element region is covered. This light reduction mask 150 is formed by thinly (in the degree where light passes through) forming a metal film made of Cr, Al, or the like on an entire face of the glass substrate 110a by, for example, sputtering, and, thereafter, by patterning the metal film by photolithography. The light reduction mask 150 may be formed of resin or ITO. The light reduction mask 150 needs to be one which attenuates light of a wavelength relating to the polymerization of a polymer constituent to be described later, by a couple of percent to tens of percent.

Subsequently, a vertical alignment film (not shown) covering the surface of the picture element electrode 120 is formed by applying, for example, polyimide over the entire upper face of the glass substrate 110a. Thus, the TFT substrate 110 is completed.

The TFT substrate 110 manufactured in the above described way and the opposite substrate 130 manufactured in the same way as in the first embodiment are placed to face each other with spacers (not shown) interposed therebetween, and liquid crystals with negative dielectric anisotropy are sealed between the TFT substrate 110 and the opposite substrate 130, whereby a liquid crystal panel 100 is formed. In the liquid crystals, a predetermined amount of polymer constituent (monomer or oligomer) and polymerization initiator is added in advance.

Figure 8:
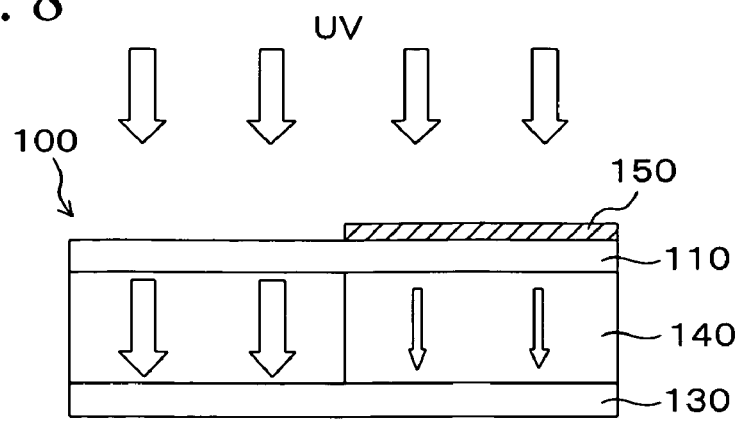
FIG. 8 is a cross-sectional schematic view showing a method of manufacturing a liquid crystal display device of the second embodiment.

Next, as shown in FIG. 8, ultraviolet (UV) is irradiated from the side of the TFT substrate 110 where the light reduction mask 150 is formed, thereby polymerizing the polymer constituent contained in the liquid crystal layer 140. In this case, polymer having large binding forces with respect to liquid crystal molecules is formed in a region where the light reduction mask 150 does not exist, while polymer having small binding forces with respect to liquid crystal molecules is formed in a region where the light reduction mask 150 exits. As a result, the threshold voltage in the region where the light reduction mask 150 does not exist becomes higher than that in the region where the light reduction mask 150 exists, hence forming in one picture element two regions having the threshold voltages which are different from each other.

Thereafter, the light reduction mask 150 is removed. However, when the light reduction mask 150 is made of resin, ITO, or the like in which the absorption of visible light is almost negligible, the light reduction mask 150 may be retained.

Next, polarizing plates (not shown) are joined to both sides of the liquid crystal panel 100, and further a backlight (not shown) is also fastened. In this way, the liquid crystal display device of the present embodiment is completed.

Incidentally, it might occur that the unreacted polymer constituent remains in the liquid crystals in the region where ultraviolet is irradiated through the light reduction mask 150, hence damaging reliability. Therefore, it is preferable that ultraviolet is irradiated over the entire face of the liquid crystal panel 100 after removing the light reduction mask 150. In addition, it is preferable that the difference between the threshold voltages in the two regions is not less than 0.3 V in order to suppress the phenomenon in which the screen looks whitish when viewed from an oblique direction. A more preferable difference between the threshold voltages in these two regions lies in the range of 0.5 to 0.7 V.

In the present embodiment, as described above, the TFT 117, the picture element electrode 120 and the like are formed on one face of the glass substrate 110a, which becomes the TFT substrate 110, and, on the other face thereof, the light reduction mask 150 is formed. After the liquid crystal panel 100 is formed, ultraviolet is irradiated from the side of the TFT substrate 110, thus causing the polymer constituent contained in the liquid crystal layer 140 to be polymerized. Thus, the region where biding forces with respect to liquid crystal molecules are large (i.e. the region where the threshold voltage is high) and the region where biding forces with respect to liquid crystal molecules are small (i.e. the region where the threshold voltage is low) are simultaneously formed in one picture element. Consequently, in the liquid crystal display device manufactured in the present embodiment, the phenomenon where the screen of the liquid crystal display device looks whitish when viewed from an oblique direction is suppressed. Moreover, in the present embodiment, since the two regions having different threshold voltages from each other can be formed in one picture element without using control electrodes, a high aperture ratio is achieved, which enables the liquid crystal display device to have a bright display.

Furthermore, even when a defect occurs in the light reduction mask 150 due to sticking of dust thereto, or the like, it is easy to repair it because the light reduction mask 150 can be once removed, and thereafter another light reduction mask 150 can be formed. In addition, since the light reduction mask 150 is in close contact with the glass substrate 110a, air does not lie between the glass substrate 110a and the light reduction mask 150 and occurrence of the wrap-around of light is also suppressed. This makes it possible to have a desired value on the ratio of areas between the two regions having different T-V characteristics from each other, thus preventing non-uniformity in display quality from occurring.

Figure 9A:
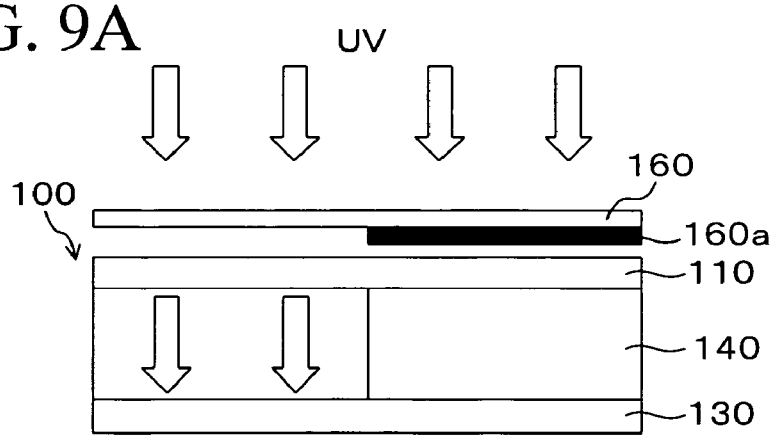
FIGS. 9A and 9B are cross-sectional schematic views showing a method of manufacturing a liquid crystal display when using exposure masks having light blocking patterns as comparative examples.
Figure 9B:
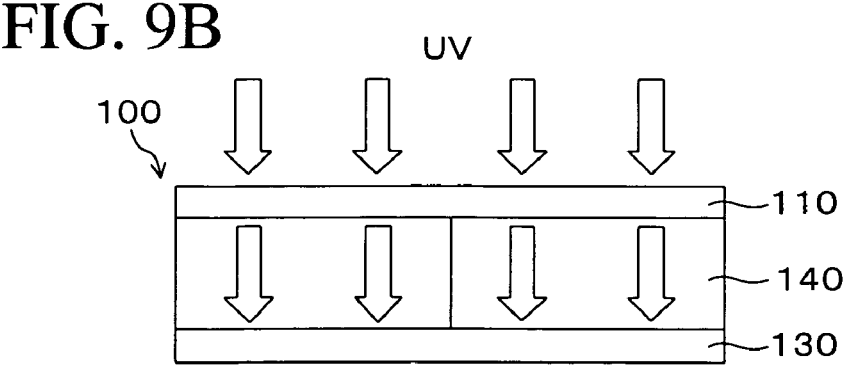

Meanwhile, it is conceivable that, after the liquid crystal panel 100 is formed without forming the light reduction mask, a first ultraviolet irradiation process is carried out in which, as shown in FIG. 9A, half of one picture element region is irradiated with ultraviolet using the exposure mask 160 having the light blocking pattern 160a; and thereafter a second ultraviolet irradiation process is processed in which, as shown in FIG. 9B, the exposure mask 160 is removed, ultraviolet is irradiated over the entire face of the liquid crystal panel 100, and thereby a plurality of regions whose degrees of biding with respect to liquid crystal molecules are different from each other are formed in one picture element. However, this method has the following problems.

That is, in the first ultraviolet irradiation process as shown in FIG. 9A, the monomer, which exists in the region where light is blocked by the light blocking pattern 160a, also starts reacting under the influence of radical generated in the exposed region. Once the polymerization of monomer occurs in the exposed region, the monomer in the light-blocked region moves to the exposed region, resulting in that the concentration of the monomer in the light-blocked region decreases. Accordingly, the controlling of polymerization reactions in the light-blocked and exposed regions becomes difficult, rendering it difficult to achieve desired T-V characteristics.

Incidentally, in general, by using a glass substrate of large size which is called a master substrate, a plurality of TFT and opposite substrates are formed at the one time. However, the sealing of liquid crystals is performed after cutting the master substrate into separate substrates. Accordingly, in the method shown in FIGS. 9A and 9B, the positioning of the exposure mask 160 is required for each liquid crystal panel, which is time-consuming. Moreover, since the reaction progresses during the interval between the first and second ultraviolet irradiation processes, non-uniformity in display quality occurs unless the interval between the first and second ultraviolet irradiation processes is made constant.

Furthermore, the wrap-around of ultraviolet occurs due to a layer of air existing between the liquid crystal panel 100 and the exposure mask 160, and thus the ratio of areas between the region where the threshold voltage is high and the region where the threshold voltage is low is deviated from a desired value, hence possibly causing non-uniformity in display quality.

On the other hand, in the manufacturing method of the present embodiment, the above described problems do not occur, and the liquid crystal display device in which display quality is favorable and non-uniformity in display quality does not occur can be manufactured.

Hereinafter, a liquid crystal display device was actually manufactured according to the present embodiment, and the results of measuring the T-V characteristics for the region where ultraviolet was irradiated through a light reduction mask and the region where ultraviolet was irradiated without a light reduction mask will be described.

EXAMPLE 1

A Cr film was formed on one face of a glass substrate (a glass substrate for a TFT substrate) for 17 inch wide liquid crystal display device by sputtering so that transmittance becomes approximately 10%; and a light reduction mask of a predetermined shape was formed by patterning the Cr film by photolithography.

Subsequently, TFT and opposite substrates were manufactured according to the method as described above, and thereafter, a liquid crystal panel was formed by sealing liquid crystals between these substrates. For the liquid crystals, those having negative dielectric anisotropy were used; and monomer was added into the liquid crystals by the ratio of 2.0 wt % relative to the liquid crystals, and, further, photopolymerization initiator was added by the ratio of 2.0 mol % relative to the monomer.

Next, as shown in FIG. 8, non-polarized ultraviolet was irradiated from the side of the TFT substrate under the condition of 7.5 mW/cm$^2$ until reaching 10 J/cm$^2$. At this time, the intensity of ultraviolet in the region where ultraviolet was irradiated through the light reduction mask was 0.9 mW/cm$^2$.

Figure 10:
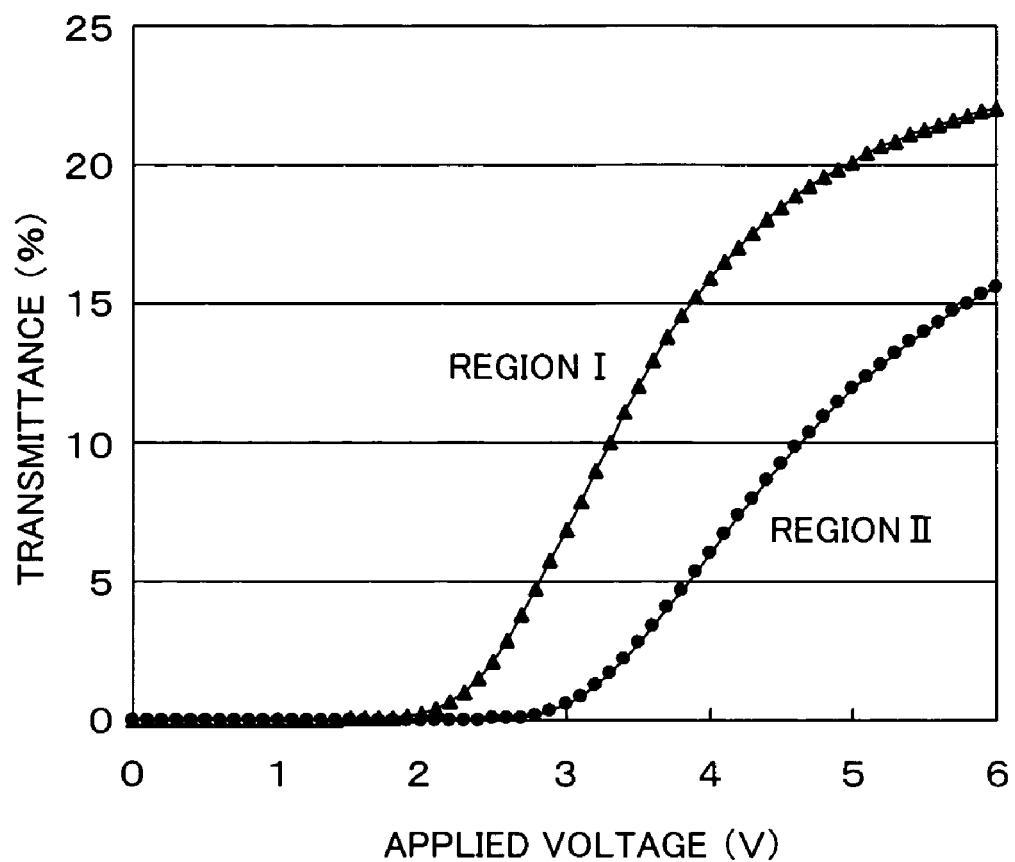
FIG. 10 is a view showing the T-V characteristics of a liquid crystal display device with respect to a first example of the second embodiment of the present invention.

The T-V characteristics of the liquid crystal display device manufactured in this manner were measured. The results thereof are shown in FIG. 10. However, the threshold voltage is, herein, defined as a voltage at the time when transmittance becomes 1%. As shown in FIG. 10, the threshold voltage in the region where ultraviolet was irradiated through the light reduction mask (region I) is approximately 2.3 V, and the threshold voltage in the region where ultraviolet was irradiated without the light reduction mask (region II) is approximately 3.1 V. The difference therebetween is 0.8 V.

EXAMPLE 2

On one face of a glass substrate, which is the same as that used in Example 1, a light reduction mask of a desired shape was formed of a positive photosensitive protective film made by JSR corporation. Thereafter, TFT and opposite substrates were manufactured in the same way as in Example 1, and liquid crystals into which monomer and photopolymerization initiator was added were sealed between the TFT and opposite substrates, whereby a liquid crystal panel was formed.

Next, as shown in FIG. 8, non-polarized ultraviolet was irradiated from the side of the TFT substrate under the condition of 7.5 mW/cm$^2$ until reaching 10 J/cm$^2$. At this time, the intensity of ultraviolet in the region where ultraviolet was irradiated through the light reduction mask was 1.3 mW/cm$^2$.

The T-V characteristics of the liquid crystal display device manufactured in this manner were measured. The results thus obtained showed that the difference between the threshold voltages in the region where ultraviolet was irradiated through the light reduction mask and in the region where ultraviolet was irradiated without the light reduction mask was 0.6 V.

EXAMPLE 3

The liquid crystal display device manufactured in Example 1 was disassembled, and the content of the remaining monomer in the liquid crystals was measured with gas chromatography. The results revealed that approximately 0.6 wt % of monomer remained. Then, a liquid crystal panel was manufactured in the same manner as in Example 1, and non-polarized ultraviolet was irradiated from the side of the TFT substrate under the condition of 7.5 mW/cm$^2$ until reaching 10 J/cm$^2$. Thereafter, the light reduction mask was removed, and non-polarized ultraviolet was irradiated over the entire liquid crystal panel under the condition of 0.6 mW/cm$^2$ until reaching 5 J/cm$^2$.

The T-V characteristics of the liquid crystal display device manufactured in this manner were measured. The results thus obtained showed that the difference between the threshold voltages in the region where ultraviolet was irradiated through the light reduction mask and in the region where ultraviolet was irradiated without the light reduction mask was 0.75 V. The liquid crystal display device was disassembled, and the remaining monomer was measured. The results thus obtained showed that the remaining monomer was reduced to the measuring limit.

Furthermore, a liquid crystal display device was manufactured in the same manner as in Example 3, except that the intensity of ultraviolet, irradiated over the entire liquid crystal panel after removing the light reduction mask, was 0.9 mW/cm$^2$. The difference between the threshold voltages of the region where ultraviolet was irradiated through the light reduction mask and of the region where ultraviolet was irradiated without the light reduction mask was 0.7 V. The liquid crystal display device was disassembled, and the results obtained by measuring the remaining monomer showed that the amount of the remaining monomer was not larger than the measuring limit.

Here, it is preferable that the intensity of ultraviolet irradiated over the entire liquid crystal panel after removing the light reduction mask, is not higher than that of ultraviolet irradiated below the light reduction mask when using the light reduction mask. When the intensity of ultraviolet irradiated over the entire liquid crystal panel after removing the light reduction mask, is higher than that of ultraviolet irradiated below the light reduction mask when using the light reduction mask, the T-V characteristics are greatly shifted, which makes it difficult to obtain a desired T-V characteristics. Furthermore, when the intensity of ultraviolet is high, there is a possibility that liquid crystals or alignment films are damaged.

In the above described first and second embodiments, the light blocking mask 145 or the light reduction mask 150 is formed after the picture element electrode 120 is formed. However, it is to be understood that the present invention is not intended to be limited to the above processes of the embodiments, and the light blocking mask 145 or the light reduction mask 150 may be formed in any step as long as it is formed before ultraviolet is irradiated.

Furthermore, in the above-described first and second embodiments, it is described that two regions having threshold voltages different from each other are formed in one picture element. However, it is understood that three or more regions having threshold voltages being different from one another may be formed in one picture element.

What is claimed is:

1. A method of manufacturing a liquid crystal display device which has a plurality of picture elements arranged in matrix form, and which has in one picture element a first and a second regions, each having different transmittance-voltage characteristics from each other, comprising the steps of:

forming a light blocking mask on a portion of a first substrate, corresponding to the second region;

placing the first substrate and a second substrate to face each other so that a face of the first substrate, on which the light blocking mask is formed, is located outside, and sealing liquid crystals having been added with a polymer constituent to be polymerized by light between the first and second substrates;

performing a first light irradiation that light is irradiated from the side of the first substrate to polymerize the polymer constituent in liquid crystals in the first region;

removing the light blocking mask; and performing a second light irradiation that light is irradiated to polymerize the polymer constituent in liquid crystals in the first and second regions.

2. A method of manufacturing the liquid crystal display device according to claim 1, wherein the light blocking mask is formed of metal or resin.

3. A method of manufacturing the liquid crystal display device according to claim 1, comprising the step of forming an alignment control structure, which controls orientations of liquid crystal molecules, on a face on the side of liquid crystals of at least one of the first and second substrates.

4. A method of manufacturing the liquid crystal display device according to claim 1, wherein dielectric anisotropy of the liquid crystals is negative.

* * * * *